3,533,901
PROCESS FOR PRODUCTION OF POLYURETHANE FOAM LAMINATES AND PRODUCT PRODUCED THEREBY
Burton J. Sutker, Plainfield, N.J., assignor to Allied Chemical Corporation, New York, N.Y., a corporation of New York
No Drawing. Continuation-in-part of abandoned application Ser. No. 322,060, Nov. 7, 1963. This application Aug. 5, 1968, Ser. No. 749,969
Int. Cl. B32b 5/20, 7/10
U.S. Cl. 161—160                               4 Claims

ABSTRACT OF THE DISCLOSURE

This invention relates to a product and to an improved process for the production of paper faced polyurethane foam, wherein a polyethylene film is incorporated between the paper and the foam to avoid penetration of the paper by the liquid foaming mixture and to improve the bonding between the paper and the polyurethane foam.

---

This application is a continuation-in-part of my prior application, Ser. No. 322,060, filed Nov. 7, 1963, now abandoned.

It is known to the art to produce polyurethane foam laminates having paper facing sheets adhered to the foam layer by continuous processes wherein a thin coating of a liquid phase, polyurethane foam-forming reactant mixture is applied to the paper facing sheet. In such processes the reactant mixture undergoes the foam-forming reaction and generates a foam layer of uniform thickness which adheres to the paper facing sheet. Various methods of depositing and spreading the liquid phase, foam-forming reactant mixture are known to the art. Thus, the liquid mixture can be distributed by means of one or more spray nozzles or by means of a high speed, auger-type mixture which deposits a small stream of the liquid on the moving paper sheet as it traverses the sheet widthwise in reciprocating motion. The thickness of the coating of reactant mixture that is deposited on the paper must be very carefully regulated since polyurethane foams usually rise to a height of from about 5 to about 60 times the thickness of the unfoamed layer of reactant mixture. Because of the need for such close contact, methods of regulating the thickness of the coating on the paper facing sheet by use of metering rolls or doctor blades have frequently been employed.

Regardless of the technique used to apply the liquid phase, polyurethane foam-forming, reactant mixture to the paper facing sheet in the processes of the prior art, a serious problem has arisen because of the tendency of the liquid mixture to penetrate the paper sheet. This phenomenon is commonly described in the art by the term "strike-through". As a result of the penetration of the paper by the liquid reaction mixture, undesirable staining which makes for an unsatisfactory product appearance occurs. Moreover, the proportion of the chemicals in the reaction mixture is altered as a result of the preferential penetration of the paper by certain components of the reaction mixture, particularly the polyisocyanate component. This results in a foam which requires increased time for curing and which has an undesirably low density, as well as other undesirable physical characteristics. Furthermore, the strength of the bond formed between polyurethane foam and paper in the processes of the prior art is often undesirably low.

It is an object of this invention to overcome the hereinabove described problems of the prior art processes. A further object of this invention is to provide an improved process for production of laminates comprising one or more paper facing sheets with a polyurethane foam layer bonded thereto wherein the penetration of the paper by the liquid phase, polyurethane foam-forming reactant mixture is substantially avoided. A still further object of this invention is to produce laminates of polyurethane foam and paper with improved bonding between the foam and the paper. Other objects and advantages of this invention will be apparent from the ensuing detailed description and the appended claims.

It has now been discovered that the penetration of the paper facing sheet by the liquid phase, polyurethane foam-forming, reactant mixture in processes for the continuous production of laminates of polyurethane foam and paper can be successfully avoided by coating the paper facing sheet with a thin layer of polyethylene prior to the application of the liquid reaction mixture. It has also been found that the polyethylene coating when prepared in the manner hereinafter described results in greatly improved bonding of the polyurethane foam layer to the paper facing sheet. The present invention thus provides an important improvement in the processes of the prior art which is applicable to processes for production of flexible, semi-rigid, or rigid polyurethane foam laminates having either a single paper facing sheet or paper facing sheets disposed on both sides of the foam layer.

The enhanced bonding between the polyethylene coated paper and the polyurethane foam that results from the application of a polyethylene coating to the paper facing sheet in accordance with this invention was indeed surprising in view of the fact that the prior art referring to the foaming of polyurethane on polyethylene sheets teaches that polyurethane foams adhere only very poorly to a polyethylene sheet. The poor adhesion of a polyurethane foam to polyethylene is disclosed, for example, in U.S. Pats. 2,956,310, 3,041,224 and 3,047,449. In fact, polyethylene has been frequently suggested for use as a release sheet in polyurethane foam laminating processes because it does not adhere to the foam. There is no prior art teaching that good adhesion between polyethylene and polyurethane foam is obtainable, nor is there any prior teaching of combining polyurethane foam with polyethylene coated paper to produce a bonded laminate structure in which the polyethylene is strongly bonded to the polyurethane foam.

The improved process of the present invention comprises the steps of applying a liquid phase, polyurethane foam-forming reactant mixture to a moving paper facing sheet that has been pre-coated with a thin layer of polyethylene, advancing the facing sheet through a foam-generating zone wherein the liquid mixture reacts to form a rising foam layer that bonds to the facing sheet, and then advancing the facing sheet and contiguous foam layer through a curing zone wherein heat is applied to effect the curing of the polyurethane foam.

The polyethylene coated paper used in the process of this invention is prepared by any method which involves heating the polyethylene in an oxidizing atmosphere at an elevated temperature, e.g., a temperature of greater than about 200° F., preferably from about 450° F. to about 700° F., prior to the application of the liquid polyurethane reactant mixture. One such method for preparing the polyethylene coated paper is the commonly used hot extrusion method, wherein the polyethylene is extruded as a flat film at a high temperature, generally about 600° F., and while still molten is pressed into contact with the paper substrate.

At these high temperatures and in the presence of an oxidizing atmosphere such as air, the surfaces of the polyethylene film are oxidized and carbonyl groups are formed thereon. These carbonyl groups provide reactive sites and thereby enhance the bonding of the polyethylene to the polyurethane foam.

Commercially prepared polyethylene coated paper is satisfactory for the purposes of this invention, provided that, as noted hereinabove, the polyethylene film was exposed to elevated temperatures in an oxidizing atmosphere prior to or during the coating operation.

It should be noted that polyethylene coated papers prepared by low temperature methods, such as solution coating, or those heated in non-oxidizing atmospheres do not exhibit this enhanced bonding to the polyurethane foam. However, even these polyethylene coated papers may be used in the instant invention provided the polyethylene is oxidized any time prior to application of the polyurethane reactant mixture onto the polyethylene facing. It should be noted also that oxidation of the polyethylene may also be accomplished by methods known to those skilled in the art, such as treating the polyethylene with a strong oxidizing solution, or by heating the polyethylene to an elevated temperature in the range noted earlier and in an oxidizing atmosphere. The thickness of the polyethylene coating is not critical, but preferentially it should be of substantially uniform thickness for optimum results. It has been found that polyethylene coatings of from about 0.1 mil, or less, to about 20 mils, or more, can be employed, with thicknesses toward the lower end of this range being employed where a flexible laminate is wanted. Preferably, the polyethylene coating should be from about 0.3 mil to about 2 mils thick for the purposes of this invention.

The liquid phase, polyurethane foam-forming, reactant mixture employed in preparing the laminates of this invention contains a polyol, or mixture of polyols, an organic polyisocyanate, water and/or a blowing agent, and usually also a catalyst and a surfactant. It can also contain conventional fillers and/or light stabilizers. The several reactants are normally mixed together to form a relatively viscous liquid and then this liquid is immediately applied to the paper sheet. The total time when the foam-forming chemicals are first mixed together until the foaming reaction commences is commonly known as the "cream time" of the mixture and can be readily varied by methods known to the art, as for example by varying the type and proportion of catalysts. On foaming, the layer of reactant mixture expands into a foam layer of about 5 to 60 times its original thickness. The foam coated paper sheet is then cured, usually by passing it through a suitable oven, and a strong bond between the paper and the polyurethane foam is thereby produced. The curing of the polyurethane foam can be carried out at temperatures of from about 150° F., or less, to about 350° F., or more, but is preferably carried out at a temperature of from about 200° F. to about 300° F. As is well known to the art, the time required for curing will depend upon the particular formulation involved and the curing temperature.

The paper facing sheets employed in the process of this invention can be comprised of any suitable paper, such as, for example, a medium or heavy kraft paper. Polyurethane foam laminates have been successfully produced by the method of this invention using sheet stock ranging from 40 lbs./3000 ft.² paper to 69 lbs./1000 ft.² cardboard.

The polyols which can be employed to produce the polyurethane foam laminates of this invention are well known in the art and include, among others, (a) hydroxyl-terminated polyesters such as castor oil and the alkylene oxide adducts thereof or the polyesters produced from adipic acid and diols such as ethylene glycol, propylene glycol, diethylene glycol, dipropylene glycol, and the like, and triols such as 1,1,1-trimethylolpropane, 1,2,6-hexatriol, glycerol, and the like; (b) polyhydroxylakanes such as ethylene glycol, propylene glycol, 1,3-dihydroxypropane, 1,3-dihydroxybutane, 1,4-dihydroxyhexane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like, and the alkylene oxide adducts of the above-exemplified polyhydroxyalkanes, preferably the ethylene oxide, propylene oxide and epoxybutane adducts; (c) trialkanolamines such as triethanolamine, triisopropanolamine, tributanolamine, and the like, and the alkylene oxide adducts thereof; (d) alkylene oxide adducts of mono- and polyamines such as the ethylene oxide, 1,2-epoxypropane, and epoxybutane adducts of methylamine, ethylamine, isopropylamine, butylamine, benzylamine, aniline, ethylenediamine, diethylene triamine, triethylenetetramine, 1,3-butanediamine, 1,3-propanediamine, 1,4-butanediamine, and the like; (e) alkylene oxide adducts, wherein the alkylene oxides have from 2 to 4 carbon atoms, of non-reducing sugars and sugar derivatives such as sucrose, methyl glucoside, ethyl glucoside, ethylene glycol glucoside, glycerol glucoside, 1,2,6-hexanetriol glucoside, and the like; (f) alkylene oxide adducts, wherein the alkylene oxides have from 2 to 4 carbon atoms, of polyphenols such as bisphenol A, bisphenol F, condensation products of phenol and formaldehyde, the 1,1,3-tris(hydroxyphenyl) propanes, the 1,1,2,2-tetrakis(hydroxyphenyl) ethanes, and the like; (g) alkylene oxide adducts of phosphorus and polyphosophorus acids such as the ethylene oxide, 1,2,-epoxypropane, epoxybutane, and 3-chloro-1,2-epoxypropane adducts of phosphoric acid, phosphorus acid, tripolyphosphoric acid, the polymetaphosphoric acids, and the like; and (h) the polytetramethylene glycols.

The organic polyisocyanates which can be reacted with the above-described polyols to produce the polyurethane resin are also well known and include, for example, 2,4- and 2,6-tolylene diisocyanate, hexamethylene, diisocyanate, diphenylmethane diisocyanate, 1,5-naphthalene diisocyanate, triphenylmethane triisocyanate, xylene diisocyanate, and the like.

Foaming can be accomplished by employing a small amount of water in the reaction mixture (for example, from about 0.5 to 5 weight percent of water, based on the total weight of the reaction mixture) or through the use of blowing agents which are vaporized by the exotherm of the isocyanate-hydroxyl reaction, or by a combination of the two methods. All of these methods are known in the art. The preferred blowing agents are certain halogen-substituted aliphatic hydrocarbons which have boiling points between about −40° C. and 70° C., and which vaporize at or below the temperature of the foaming reaction. These blowing agents, include, for example, trichloromonofluoromethane,
dichlorodifluoromethane,
dichloromonofluoromethane,
dichloromethane,
trichloromethane,
bromotrifluoromethane,
chlorodifluoromethane,
chloromethane,
1,1-dichloro-1-,2,2-trichloroethane,
chloropentafluoroethane,
1,1,1-trifluoro-2-chloroethane,
1-chloro-1-fluoroethane,
1-chloro-2-fluoroethane,
1,1,1-trichloro-2,2,2-trifluoroethane,
hexafluorocyclobutene, and
octafluorocyclobutane.

Other useful blowing agents include low-boiling hydrocarbons such as butane, pentane, hexane, cyclohexane, and the like. Many other compounds easily volatilized by the exotherm of the isocyanate-hydroxyl reaction also can be employed.

Catalysts can be employed in the reaction mixture for accelerating the isocyanate-hydroxyl reaction. Such catalysts include a wide variety of compounds such as, for example: (a) tertiary amines such as trimethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, and the like, and tertiary amine oxides such as pyridine N-oxid; (b) tertiary phosphines such as trialkylphosphines, dialkylbenzylphosphines, and the like; (c) strong bases such as alkali metal and akaline earth metal hydroxides, alkoxides and phenoxides; (d) acidic metal salts of strong acids such as ferric chloride, stannic chloride, stannous chloride, antimony trichloride, bismuth nitrate, bismuth chloride; and the like; (e) salts of organic acids with a variety of metals such as alkali metals, alkaline earth metals, aluminum, tin, lead, antimony, manganese, cobalt, nickel and copper, including, for example, sodium acetate, potassium laurate, calcium hexanoate, stannous acetate, stannous octoate, stannous oleate, lead octoate, metallic driers such as manganese and cobalt naphthenate, and the like; and (f) organometallic derivatives of tetravalent tin such as dibutyltin diacetate, dibutyltin dilaureate, dibutyltin maleate, dilauryltin diacetate, dioctyltin diacetate, dibutyltin-bis(4-dimethylaminobenzoate), dibutyltin-bis-(6-methylaminocaproate), and the like. The catalysts are employed in small amounts, for example, from about 0.001 percent to about 5 percent, based on the total weight of the reaction mixture.

The polyurethane foams can also contain small amounts, for example, about 0.001 to 5 percent, based on the total weight of the reaction mixture of a surfactant or emulsifying agents that influences the type of foam structure that is formed. Illustrative of the suitable surfactants are, for example, the siloxaneoxyalkylene block having from about 10 to 80 percent by weight of siloxane polymer and from 90 to 20 percent by weight of alkylene oxide polymer. Use of such surfactants in polyurethane foam formulations is well known in the art.

A typical polyurethane foam laminate, illustrative of the laminates that can be produced by the improved process of this invention, is prepared by laying down on commercially available 60 lbs./3000 ft.² kraft paper, coated by the hot extrusion method, with a 1 mil thick coating of polyethylene, a liquid reactant mixture of the following composition:

| | Parts by weight |
|---|---|
| Tulylene diisocyanate | 76 |
| Polyol A [1] | 50 |
| Polyol B [2] | 50 |
| Trichloromonofluoromethane | 25 |
| Surfactant [3] | 1 |
| Dibutyltin dilaurate | 0.2 |

[1] Mixture of propylene oxide adduct of sorbitol and propylene oxide adduct of glycerol.
[2] Mixture of propylene oxide adduct of tris(hydroboxyphenyl)propane and propylene oxide adduct of glycerol.
[3] Trifunctional ethoxy end blocked dimethylpolysiloxane/polyoxyethylene-polyoxypropylene block copolymer.

The polyurethane foam laminates of this invention are of widespread utility. Thus, for example, the paper-foam laminates of flexible polyurethane foam are widely used in the packaging field and those of rigid polyurethane foam are used as an insulating material.

Various changes and modifications can be made in practicing the present invention without departing from it and therefore it is intended to include in the scope of the appended claims all such modifications and variations as may be apparent to those skilled in the art from the description given herein. Thus, for example, the liquid phase polyurethane foam-forming reactant mixture, which is applied to the polyethylene-coated paper, can be a froth which has been formed by the action of a gas or by mechanical means known to the art.

I claim:
1. In a process for the production of a bonded laminate structure comprising a paper facing sheet and a layer of polyurethane foam, said process comprising:
   (a) applying a liquid polyurethane foaming mixture on a surface of the paper facing sheet,
   (b) initiating the foaming of said foaming mixture, and
   (c) curing the foamed polyurethane-paper laminate,
the improvement which comprises employing between said paper facing sheet and said polyurethane foam, an interface film of polyethylene of a thickness of from about 0.1 mil to about 20 mils, said polyethylene film being oxidized to provide available carbonyl groups prior to the application of said foaming mixture.

2. The process of claim 1, wherein the polyethylene film is oxidized prior to the application of the foaming mixture by heating said polyethylene film to a temperature of from about 450° F. to about 700° F. in an oxidizing atmosphere.

3. The process of claim 1, wherein the thickness of the polyethylene coating is from about 0.3 mil to about 2 mils.

4. A bonded laminate structure comprising a polyurethane foam at least one surface of which is bonded to an oxidized polyethylene film of from about 0.1 mil to about 20 mils thickness, said polyethylene film being bonded to a paper facing sheet.

References Cited

UNITED STATES PATENTS

| 3,061,475 | 10/1962 | Wallace | 156—79 |
| 3,198,692 | 8/1965 | Bridgeford | 161—188 |

WILLIAM J. VAN BALEN, Primary Examiner

U.S. Cl. X.R.

161—165, 188, 190, 250, 411; 156—79